(12) United States Patent
Merck

(10) Patent No.: US 7,302,550 B1
(45) Date of Patent: Nov. 27, 2007

(54) STACK OF VARIABLE LENGTH OPERANDS AND METHOD FOR USE

(75) Inventor: Martin Merck, Würzburg (DE)

(73) Assignee: Giesecke & Devrient GmbH, Munich (DE)

( * ) Notice: Subject to any disclaimer, the term of this patent is extended or adjusted under 35 U.S.C. 154(b) by 914 days.

(21) Appl. No.: 10/030,106

(22) PCT Filed: Jul. 17, 2000

(86) PCT No.: PCT/EP00/06833

§ 371 (c)(1),
(2), (4) Date: May 23, 2002

(87) PCT Pub. No.: WO01/06347

PCT Pub. Date: Jan. 25, 2001

(30) Foreign Application Priority Data

Jul. 19, 1999 (DE) ................. 199 33 130

(51) Int. Cl.
*G06F 9/34* (2006.01)
(52) U.S. Cl. .................. 712/202; 712/200
(58) Field of Classification Search ............ 712/202, 712/25, 200, 210
See application file for complete search history.

(56) References Cited

U.S. PATENT DOCUMENTS

| | | | | |
|---|---|---|---|---|
| 3,200,379 A | * | 8/1965 | King et al. ............ | 712/202 |
| 3,873,976 A | * | 3/1975 | Morris .................. | 710/52 |
| 4,135,156 A | * | 1/1979 | Sanders et al. ........ | 455/13.2 |
| 4,213,188 A | * | 7/1980 | Smolko et al. ........ | 708/532 |
| 4,334,269 A | * | 6/1982 | Shibasaki et al. ..... | 712/202 |
| 4,408,291 A | * | 10/1983 | Gunzberg et al. ..... | 700/115 |
| 5,396,608 A | | 3/1995 | Garde | |

FOREIGN PATENT DOCUMENTS

| | | |
|---|---|---|
| EP | 0492970 B1 | 8/1995 |
| GB | 2297399 | 7/1996 |
| JP | 07193511 | 7/1995 |
| WO | WO 98/21647 | 5/1998 |
| WO | WO 98/36536 | 8/1998 |

OTHER PUBLICATIONS

IBM. "Storing Variable Length Data in a Circular Buffer." IBM Technical Disclosure Bullentin, Mar. 1993. vol. 36, Is. 3. p. 491-494.*

"Storing Variable Length Data in a Circular Buffer", IBM Technical Disclosure Bulletin, vol. 36, No. 3, Mar. 1993, XP 000354850, pp. 491-493.

* cited by examiner

*Primary Examiner*—Eddie Chan
*Assistant Examiner*—Aimee J Li
(74) *Attorney, Agent, or Firm*—Bacon & Thomas PLLC

(57) ABSTRACT

An operand stack (10) permits optimization of memory space and a continuous check of operand type by creating a type memory (20) which stores type information for each operand, said information comprising information about the length of the operand.

This length information available for each single operand permits the operands to be stored extremely densely, while the prior art uses uniform length stack elements for each operand, their length depending on the longest operand.

10 Claims, 2 Drawing Sheets

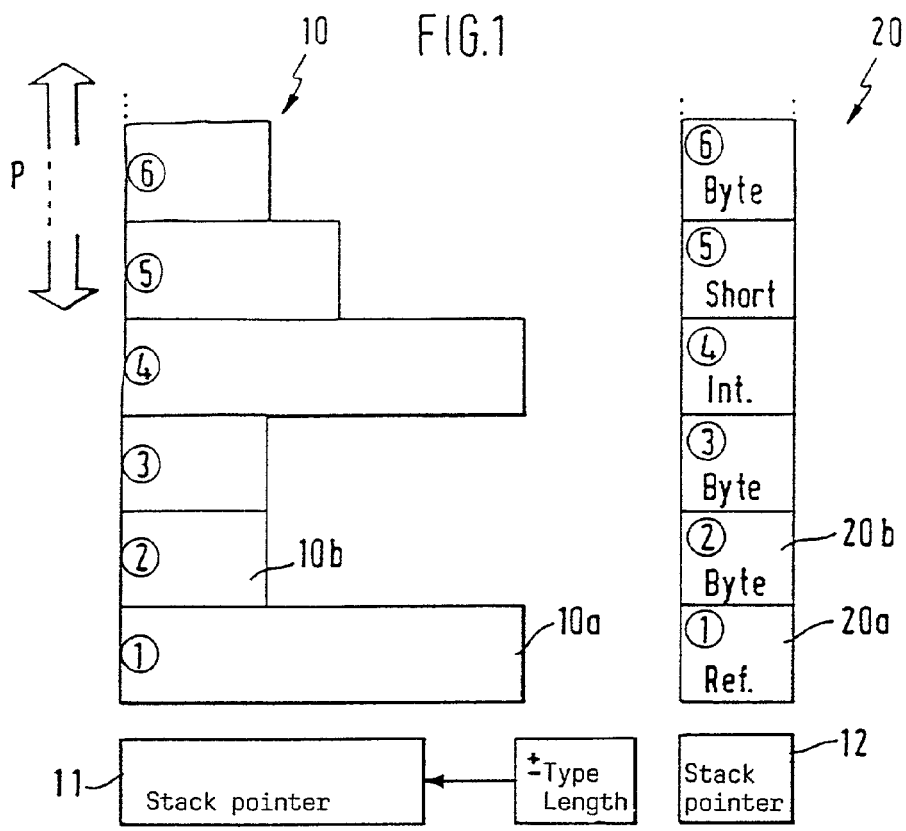
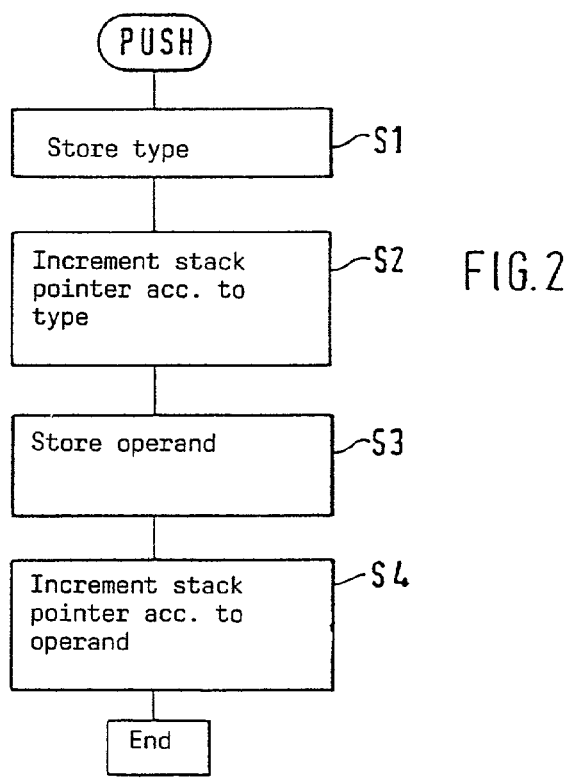
FIG.1
FIG.2

STACK OF VARIABLE LENGTH OPERANDS AND METHOD FOR USE

In a calculating machine, be it a hardware machine or a virtual machine, operands are processed in a central processing unit. The processed operands are stored in an operand memory, the operands to be processed being read from the operand memory.

The operands are customarily stored using a memory stack. Such an operand memory stack (or more simply, operand stack) is organized in such a way that a memory location of given size is reserved for a certain number of stack elements of the operand stack, the stack elements of constant length being set up in this memory area. A stack pointer, formed for example as a counter, is incremented or decremented at each memory access.

To facilitate understanding of the invention, reference is made to FIG. 5 of the drawing which schematically shows prior art operand stack 100. Operand stack 100 contains stack elements 100a, 100b, ... each of constant length. Said constant length, Lmax, is determined by the longest operand to be stored. In the shown example a reference value is stored in "bottom" stack element 100a. The second operand in stack element 100b is a byte value, as is the operand in third stack element 100c. An integer is located in the fourth stack element. A short value and a byte value are stored as operands in the fifth and sixth stack elements.

In the present example the longest occurring operands are "reference" in the first stack element and "integer" in the fourth stack element. Each stack element 100a, 100b, ... occupies a memory location with length Lmax. Each stack element 100 a, 100b, ... with length Lmax occupies a memory location which is to include four addressable locations in the example considered here. When a further operand is placed on operand stack 100 the content of stack pointer 101 is incremented by "4" so that it points to the next free stack element. After an operand is read, the content of the stack pointer is decremented by "4."

The disadvantage of uniform size stack elements, that is, stack elements each with four smallest addressable locations in the present example, is the considerable waste of space in storing relatively short operands. In the present example only the operands in stack elements "1" and "4" are operands with maximum length Lmax, the other operands in stack elements "2," "3" and "6" (byte values) being the shortest operands and occupying not even half of the available memory space with length Lmax. The short value at "5" occupies only half of the available space in the stack element.

When the operands stored in operand stack 100 are processed it should be ensured that the operands stored in the operand stack actually correspond to the operand type according to the program. However, a continuous type check is impossible with the organization of the operand stack outlined in FIG. 5. A check with the aid of a verification process is possible, but this involves a complete data flow analysis which means considerable effort.

The invention is based on the problem of providing an operand stack which optimizes the memory space requirement and further permits a continuous type check. Furthermore, there is to be provided a method for operating an operand memory which optimizes the memory requirement for the operand stack and allows a continuous type check.

To solve this problem the invention provides an operand stack having a type memory associated therewith, the type memory storing for every single stored operand the corresponding type information which contains length information about said operand. Said information prevents memory space from being wasted when operands of different length are stored; the information is instead stored extremely densely in the operand stack. The inventive operand stack has two basic organizational forms: in a first form the type memory is formed as a stack with constant length stack elements separate from the operand memory. In an alternative version the type memory is integrated into the operand memory, that is, each operand which can have one of a predetermined number of given lengths is directly contiguous to the corresponding type information.

Since the type information available for each operand contains length information about the operand, it is clear from the start how much memory space the particular operand requires. Upon a write operation to the operand memory, that is, when a new operand is placed on the operand stack, the type information is stored in connection with said operand. When the operand is read, the type information is then first evaluated, and accordingly the stack pointer can be set so that the corresponding number of memory elements is read for the operand. The type information is binary-coded, for example as a four-digit code which is unique for each occurring operand type. From this code the corresponding length information can be gained with the aid of a table.

The type information stored in connection with each single operand permits a continuous check of operand type during processing of the operands. Before an operand is read from the operand stack, the type information is read in order to read the operand with the corresponding number of locations. The thus available type information can be compared with desired information of a checking program. If comparison is negative, that is, the pending operand type does not match the expected operand type according to the program, error handling is performed.

The invention thus achieves optimization of memory space, on the one hand, and provides information allowing a continuous check of operand type, on the other hand.

The inventive operand stack and inventive method for operating an operand stack can be employed in connection with a hardware calculating machine but also in connection with a virtual calculating machine. The abovementioned advantages are obtained in both cases.

In the following, some examples of the invention will be explained in more detail with reference to the drawing, in which:

FIG. 1 shows a schematic representation of an operand stack in connection with a type memory;

FIG. 2 shows a schematic flowchart illustrating the operation upon storage of an operand;

Figure 5:
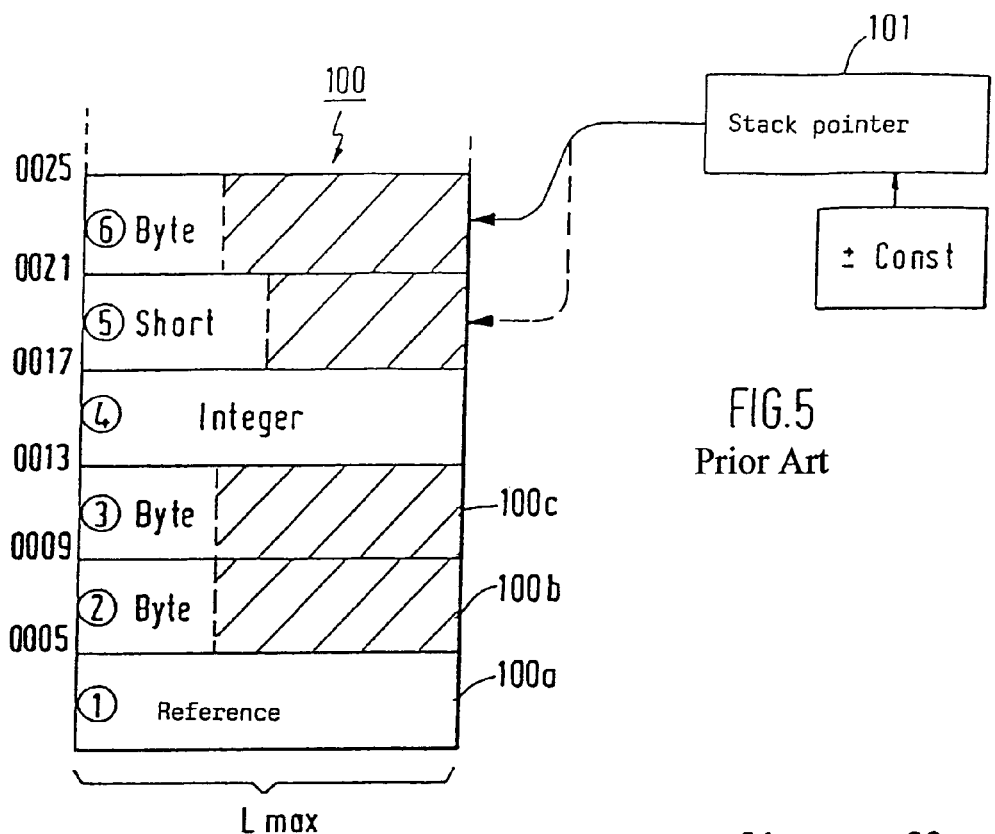
FIG. 5 shows a schematic representation of a prior art operand stack.

As stated above in connection with FIG. 5, stack elements 100a, 100b, ... each of constant length Lmax are provided in operand stack 100 in the prior art so that a considerable amount of memory space is lost in the case of shorter operands due to the memory space not used. This lost amount of memory space is shown by hatching in FIG. 5.

FIG. 1 shows schematically a first embodiment of an operand stack according to the invention, likewise illustrating the method for organizing said operand stack.

As indicated by the representation on the left in FIG. 1, individual stack elements 10a, 10b, . . . of operand stack 10 are just as long as the operand to be stored therein. The length information for each operand is located in separate type memory 20, which is likewise organized as a stack. Stack elements 20a, 20b of type memory 20 all have constant length. Each stack element 20a, 20b, . . . of type memory 20 stores a four-bit code which clearly identifies the type of associated operand. Thus, the type information for operand "1" in stack element 20a identifies a reference value. The type information also clearly defines the particular length of the operand. At the bottom of FIG. 1 corresponding stack pointer 12 is indicated for type memory 20. For read-write operation of type memory 20, stack pointer 12 is incremented or decremented. The value of stack pointer 12 corresponds to the address of the next free memory location.

Stack pointer 11 for operand memory 10 is not incremented or decremented with a constant value but in accordance with the length of the operand. Thus, a value corresponding to the length of the operand is added to stack pointer 11 when an operand is placed on operand stack 10, the content of stack pointer 11 being decremented by the length of the operand when said operand is read from operand memory 10. The value of stack pointer 11 corresponds to the address of the next free memory location. During operation of the calculating machine the height of operand stack 10 is continuously reduced and increased in accordance with the individual read and write operations.

The expert will see that operand stack 10 has variable length stack elements 10a, 10b, . . . which are contiguous without a gap in the available memory space. Type memory 20 is created at another location in the memory.

FIG. 2 illustrates in the form of a flowchart a write operation placing an operand on operand stack 10. In step S1 the operand type to be stored is stored in type memory 20, in step S2 stack pointer 12 is incremented. In step S3 the operand is placed on operand stack 10, and in step S4 stack pointer 11 of the operand stack is incremented in accordance with the type placed on operand stack 10, that is, in accordance with the length of the operand which is known from the type information. As described above, stack pointers 11 and 12 then point to the next free memory location.

Figure 3:
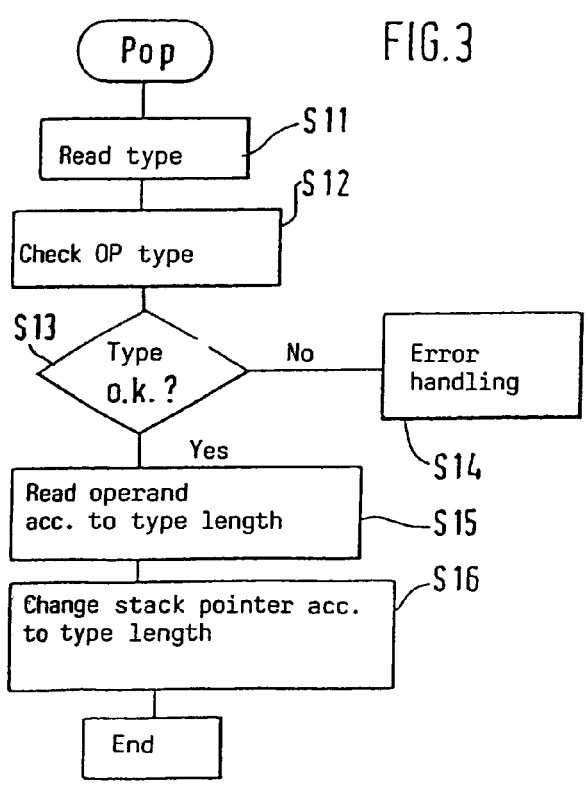
FIG. 3 shows a flowchart illustrating the operation when an operand is read from an operand stack, a type check of the operand being performed.

FIG. 3 shows schematically the sequence in a read operation. In step S11 the top element of the stack is read from type memory 20. The value of stack pointer 12 is decremented by the length of a stack element, four bits in the example, since, as described above, stack pointer 12 points to the initial address of the next free stack element. The value of decremented stack pointer 12 thus forms the initial address for reading the top element in type memory 20. In the present example, the information read from type memory 20 is that the operand is a byte value.

In step S12 a check of the operand type is performed. This check is not the subject matter of the invention and will not be explained in any detail here.

In step S13 it is inquired whether the type is the expected operand type. If not, error handling is performed in step S14.

If the operand type corresponds to the expected type, the corresponding operand is read in step S15, that is, the operand with the length corresponding to the byte value is taken from the top stack element in operand stack 10 in FIG. 1. The value of stack pointer 11 is decremented by the length of the operand, i.e. the length of the byte value in the present example. The value of stack pointer 11 thus forms the initial address of the top element to be read of operand stack 10. The value of stack pointer 11 therefore corresponds to the address of the next free memory element again after reading.

Figure 4:
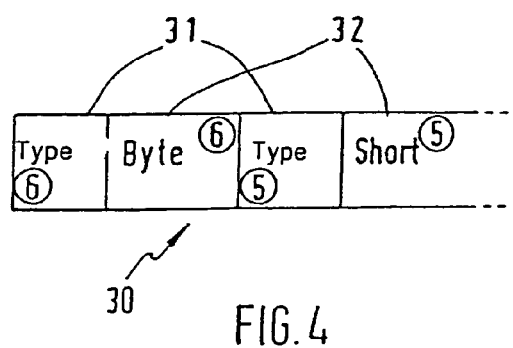
FIG. 4 shows a schematized representation of an embodiment of an operand stack alternative to the embodiment according to FIG. 1.

FIG. 4 shows an organization of the operand stack alternative to FIG. 1. Operand stack 30 contains type memory elements 31 of constant length and operand memory elements 32 whose length depends on the particular type. Operand stack 30 in FIG. 4 can likewise be operated according to the sequence of FIG. 2 and FIG. 3, the newest operands being shown on the right in FIG. 4 while the newest operands are on the top of the stack in FIG. 1.

The invention claimed is:

1. A calculating machine containing an operand memory stack and a processing unit for processing individual operands according to a program, the operand memory stack comprising:

operands of different lengths that are contiguously packed as a stack; and a type memory comprising memory elements of constant length that store, for each operand stored in the operand memory stack, a type information that is coded and which contains information about the length of a corresponding operand;

wherein the length of a particular operand type is stored in a table in dependence on the corresponding coded type information.

2. A calculating machine according to claim 1, wherein the type memory is formed separate from the operand memory stack as a stack with constant length stack elements.

3. A calculating machine according to claim 1, wherein the type memory is integrated into the operand memory stack such that each operand is directly contiguous to the corresponding coded type information.

4. A calculating machine according to claim 1, wherein the operand memory stack is formed as a virtual stack for a virtual calculating machine.

5. A calculating machine according to claims 1, 2, 3 or 4, further comprising an operand type checking device which is activated at each read access to the operand memory stack.

6. An operand memory stack according to claims 1, 2 or 3, wherein the operand memory stack is contained within a smart card having an integrated virtual calculating machine.

7. A method for operating an operand memory stack in a calculating machine, the method comprising:

providing stack elements of the operand memory stack that are used for storing operands of different length in a contiguously packed arrangement;

creating a type memory element of uniform length for each operand in the operand memory stack;

storing coded type information that contains length information about the length of each corresponding operand in the type memory elements;

evaluating said length information at each access to the operand memory stack; and storing the length of a particular operand type in a table in dependence on the corresponding coded type information.

8. A method according to claim 7, wherein the type memory elements are created in the form of a separate stack.

9. A method according to claim 7, wherein the type memory elements are stored contiguously with the corresponding operand memory stack element.

10. A method according to claims 7, 8 or 9, wherein a type check is performed at each read access to the operand memory stack.

* * * * *